Sept. 2, 1941.　　　　E. M. SPLAINE　　　　2,254,456
OPHTHALMIC MOUNTING
Filed Oct. 6, 1939
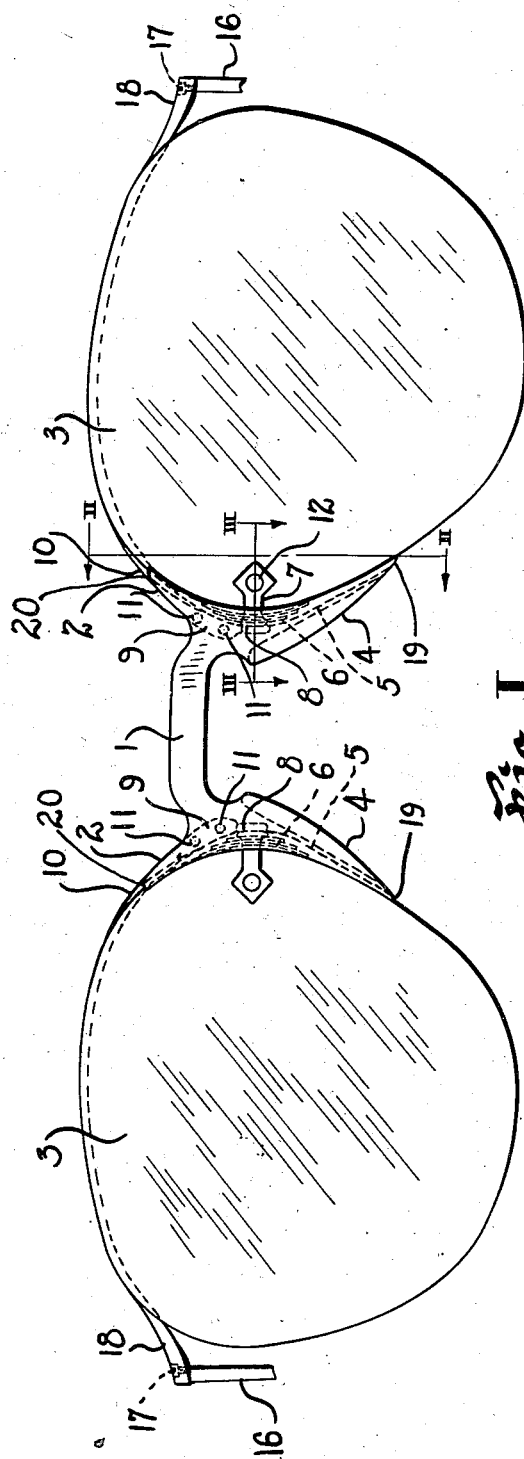
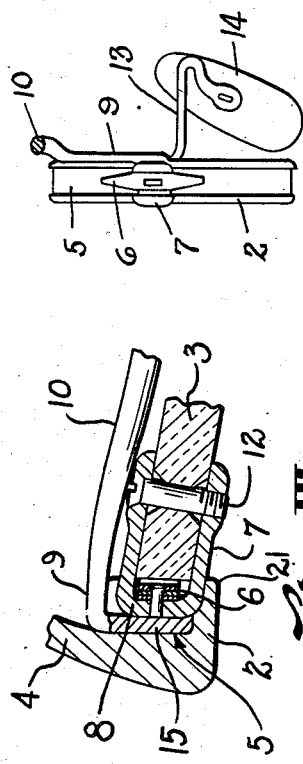
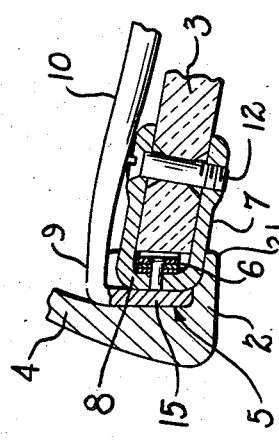
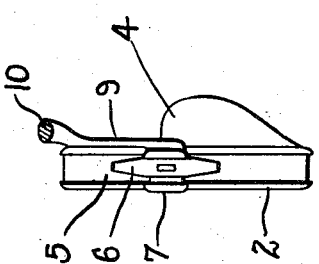
INVENTOR.
EDWARD M. SPLAINE
BY Harry H. Styll
ATTORNEY.

Patented Sept. 2, 1941

2,254,456

UNITED STATES PATENT OFFICE 2,254,456

OPHTHALMIC MOUNTING

Edward M. Splaine, Southbridge, Mass., assignor to American Optical Company, Southbridge, Mass., a voluntary association of Massachusetts Application October 6, 1939, Serial No. 298,297

10 Claims. (Cl. 88—41)

This invention relates to improvements in ophthalmic mountings and has particular reference to improved means of making the same.

One of the principal objects of the invention is to provide a combined metallic and non-metallic lens supporting structure having a semi-rimless type mounting, constituting a bridge member and relatively long and slender temple supports with means for securing lenses to said supporting structure and novel means of making, assembling and fitting the same.

Another object is to provide a semi-rimless type ophthalmic mounting with a bridge member formed of non-metallic material having integral nose bearing pads secured to the lenses by separate lens holding means and having relatively long and slender adjustable temple supports shaped substantially to follow the upper contour edges of the lenses.

Another object of the invention is to provide a semi-rimless type ophthalmic mounting with a non-metallic bridge member joined to the lenses of the mounting by lens straps and having relatively long and slender adjustable temple supports shaped substantially to follow the upper contour edges of the lenses.

Other objects and advantages of the invention will become apparent from the following description taken in connection with the accompanying drawing and it will be apparent that many changes may be made in the details of construction and arrangement of parts shown and described without departing from the spirit of the invention as expressed in the accompanying claims. I, therefore do not wish to be limited to the exact details of construction, arrangement of parts and details as the preferred form only has been given by way of illustration.

Referring to the drawing:

Fig. I is a front elevation of an ophthalmic mounting embodying the invention;

Fig. II is a sectional view taken on line II—II of Fig. I with the lens removed from the lens holding means;

Fig. III is a fragmentary sectional view taken as on line III—III of Fig. I;

Fig. IV is a view generally similar to Fig. II illustrating a modified form of the invention.

The invention relates particularly to the provision of an ophthalmic mounting of the semi-rimless type with the bridge and nose bearing pads of said mounting formed of non-metallic material having non-tarnishing or non-corrosive characteristics and which is relatively light and comfortable during use.

The invention further comprises a pair of relatively long and slender temple supports secured to the bridge member so as to progress outwardly about the upper contour edges of the lenses and terminate in temple connections. The lenses are secured to the lens holding means located adjacent the bridge and the general construction is such that strain imparted to the temple supports will be directed to the bridge member so that the lenses will not receive said strain. The mounting is such that it will provide the comfort and desirable characteristics of a non-metallic mounting in the vicinity of said mounting which engages the face, will provide relatively long adjustable temple supports for relieving strain on the lenses and will also provide the desirable full vision characteristics of rimless type mountings.

Referring more particularly to the drawing wherein like characters of reference designates like parts throughout the several views the device comprises broadly a non-metallic bridge member 1 having side portions 2 shaped to substantially follow the adjacent contour edges of the lenses 3 of the mounting. The side portions 2 have integral rearwardly extending nose bearing pad portions 4 thereon. The said side portions 2 are preferably provided with a channel portion 5 in which the adjacent peripheral edge of the lens is adapted to lie when the parts are in assembled relation with each other. The channel 5 also houses a plurality of lens edge engaging springs 6 carried by a lens strap 7. The lens strap 7 lies within the channel 5 and has an end portion 8 connected with the flared end 9 of a relatively long and slender temple support 10 shaped to follow substantially the upper contour edges of the lens. The flared portion 9 of the temple is secured to the side portions 2 of the bridge by rivets or the like 11 which extend through the material of said side portions and are anchored to the flared portion 9 of the temple support. The lens strap 7 is connected to the lens by suitable connecting means 12 extending through an opening in the lens, see Fig. III. The connecting means 12 may be a screw, solder connected rivet or any other suitable connection known in the art. The lens 3 is preferably pivotally connected to the lens strap 7 and is limited in its pivotal movement by a plurality of resilient members 6 and also by the depth of the groove on the ends 19 and 20 of the side portions 2. The base of the channel 5 is so formed as to provide sufficient clearance for the pivotal movement of the lens on the lens holding means 12 particularly at the ends 19 and 20.

It is to be understood that although the lens edge is shown in Fig. III to be substantially flush with the edge of the channel 5 as shown at 21, the lens edge tapers into the channel 5 from adjacent the lens strap to the ends 19 and 20 of the side portions 2 so that at the ends 19 and 20 the lens edge preferably lies within the channel 5 although it may lie flush or even outside as long as the lens edge does not come in actual contact with the base of the channel 5, so that the movement of the lens about its connection at 12 is permitted to a limited degree. It is preferable to have the ends 19 and 20 limit this pivotal movement before the limiting effect of the resilient means 6 is completely applied, but it is to be understood that the limits may act together, or the springs first, as desired.

Although the lens holding means is shown as having two spaced ears engaging the opposed side surface of the lens it is to be understood that the said lens strap may be formed of a single ear if desired.

It is also to be understood that instead of providing integral nose bearing pads 4 on the side portions 2 the temple supports 10 may be provided with an integral arm 13 progressing outwardly and rearwardly of the flared end 9 as shown in Fig. IV. This arm 13 provides adjustable means for pivotally supporting a nose bearing pad 14. This pad may be provided with a non-metallic covering similar to the material used in forming the bridge 1. This non-metallic material may be of the commercially known synthetic resinous type or may be formed of a cellulose shell or other desirable material.

Referring more particularly to Fig. III it is to be noted that the flared portion 9 of the temple support 10 is secured to the base of the lens strap 7 by a portion 15 projecting inwardly of the side portion 2 of the bridge. The portion 15 is secured to the base of the lens strap 7 as by soldering, welding or the like. The channel portions 5 of the side portions 2 are so formed as to conceal all of the connected portions of the mounting adjacent the lens edge when the said mounting is viewed from the front.

Although applicant has shown and described a lens strap having a plurality of resilient means 6 thereon and has described the side portions 2 as having a channel in which the adjacent contour edge of the lens lies, the said side portions 2 may be provided with an edge surface abutting directly with the edge surface of the lens. It is to be understood, of course, that the said abutting edge of the portion 2 is shaped to substantially follow the shape of the lens throughout its engaging area. In this instance, the lens strap would be rigidly secured to the lens so that the lens would not have a pivotal connection thereon and would not need the resilient means 6. Parts of the side portions 2 extend outwardly of the opposite sides of the lens strap since the lens edge lies in the channel 5, particularly at 19 and 20 and, in this instance, provide edge bearing means tending to aid in rigidly retaining the lens in assembled relation with the strap and supplements the resistance of the strap to torsional strain on the lens.

A simple method of assembling a mounting of this type is to heat the portions 2 until they soften, then press the edge of the lens which is to be adjacent the portions 2 against them in the channel 5 to shape them to the lens edge contour. The lens edge may be in the channel, flush with its edge or spaced therefrom as desired. The channel 5 may be dispensed with in the rigid type described above, if desired.

The relatively long and slender temple supports are preferably formed of a metal having a ductile, pliable or resilient nature or may possess one or more of said characteristics. Although the said temple supports are shown as following the upper contour edges of the lenses directly in the rear of said edges, it is to be understood that they may be positioned in the plane of the lenses or in a plane in the front of the lenses as desired. Suitable temples 16 are pivotally attached at 17 to the ends 18 of the relatively long and slender temple supports.

Ophthalmic mountings of the character described are formed through the provision of a plurality of bridge members, in instances when the nose pads are formed integral with said bridge member, or a plurality of bridge members of graded sizes, that is, with different fixed distances between the nose pads. Relatively long and slender temple supports which are of graded lengths and have lens holding means thereon are secured to the side portions of said bridge members as by rivets 11 or other suitable attaching means. The lenses are formed to the prescriptive requirements of the wearer and to the given size and shape. A lens supporting structure constituting a bridge member of the size required by the individual and having temple supports of lengths suitable to be fitted to the lenses is selected. An attaching opening is formed in the lenses and the said lenses are secured to the lens holding means. The relatively long and slender temple supports are then adjusted to follow substantially the upper contour shape of the lenses and are simultaneously adjusted to space the temples in required spaced relation with each other to fit the face of the individual, and the said temple connection ends of the temple supports are bent to dispose the lenses in a desired plane relative to the line of normal straight ahead vision through said lenses. Slight adjustments may be made to fit the nose piece to the face of the wearer by removing a portion of the contacting faces of the nose pads with the nose.

In instances when the bridge member has adjustable nose pad supporting arms, such as illustrated at 13 in Fig. IV, a single mounting may be adjusted to the facial characteristics of several different individuals particularly in the vicinity of the nose so that it is only necessary to select a bridge member which will space the center of the lenses a proper amount according to the distance between the centers of the pupils of the eyes.

With the above latter arrangement, the adjustments for the fit of the nose pads to the nose and the adjustments of the temple supports may be made without disturbing the supported relation of the lenses and the said lenses may be interchanged without disturbing the adjusted relation of the parts of the mounting.

Although the bridge means has been described as being preferably formed of non-metallic material, it is to be understood that metallic materials or other materials might be used. In such instances, the central arch portion of the bridge member may be so dimensioned and formed as to permit adjustment thereof to change the distance between the lens holding means. This arrangement, in combination with the adjustable temple supports and the adjustable nose pad supports, such as illustrated in Fig. IV, will provide means whereby a single mounting may be adjusted to meet the facial requirements of different individuals and will eliminate the necessity of having to stock different sizes of bridge members within reasonable limits.

The bridge, of course, would have the side channel portions set forth herein and the central arch portion would be provided with adjustable portions intermediate said side portions. Such adjustable portions might be rearwardly extending loops intermediate the main central arch portion and the depending side portions as is common in the art.

It is to be noted that the temple connection ends of the relatively long and slender temple supports are preferably located at a position commonly known as a high position in the art. This position is above the useful field of side vision or above the centers of the pupils of the eyes at the normal straight ahead vision position when the mounting is in position of use on the face. It is to be understood that the temple supports may be positioned at a point below this position if desired.

It is to be understood that the equivalent of a channel 5 may be used instead, if desired. The intention in its use is to provide a bridge of the type described having a slight pivotal movement with respect to the lens.

From the foregoing description it will be seen that simple, efficient and economical means have been provided for accomplishing all of the objects and advantages of the invention.

Having described my invention, I claim:

1. A supporting structure for the lenses of an ophthalmic mounting comprising a bridge member having a central arch portion and integral depending side portions with longitudinal channels therein adapted to receive the adjacent contour edge of the lenses, lens holding means in the form of lens straps having portions shaped to overlie the opposed side surfaces of the lenses and to be secured to said lenses by connecting means extending through the lenses, said lens holding means having a portion shaped to overlie the edge of the lens and lying within the channel, relatively long and slender temple supports secured adjacent one end thereof to the lens holding means and secured adjacent said end to the bridge member with the end thereof attached to said lens holding means functioning to retain the lens holding means in desired position in said channel with the remainder of said long and slender temple supports shaped to follow the upper contour shape of the lenses when the supporting structure is in connected relation with said lenses.

2. A lens supporting structure for use with lenses comprising a bridge member having depending side portions formed with channels shaped to embrace the adjacent edges of the respective lenses, lens holding means having a portion shaped to overlie the edges of the lenses lying within said channels and having portions shaped to overlie at least one side surface of the lenses and adapted to be secured thereto, relatively long and slender temple supports shaped to follow substantially the upper contour edges of the lenses when in assembled relation therewith attached to the bridge member and having portions extending downwardly from said points of attachment with said bridge member and secured to the portion of the lens holding means lying within said channels.

3. A lens supporting structure for use with lenses comprising a bridge member having depending side portions formed with channels shaped to embrace the adjacent edges of the respective lenses, lens holding means having a portion shaped to overlie the edges of the lenses lying within said channels and having portions shaped to overlie at least one side surface of the lenses and adapted to be secured thereto, relatively long and slender temple supports shaped to follow substantially the upper contour edges of the lenses when in assembled relation therewith attached to the bridge member and having portions extending downwardly from said points of attachment with said bridge member and secured to the portion of the lens holding means lying within said channels and said depending portions of the bridge member having nose bearing portions carried thereby.

4. A lense supporting structure for use with lenses comprising a bridge member having depending side portions formed with channels extending longitudinally thereof, lens holding means having portions shaped to overlie the edge of the lens lying within said channels and having a portion shaped to overlie at least one side surface of the lens and adapted to be secured to said lens, resilient means carried by said portion shaped to overlie the edge of the lens adapted to engage the adjacent edge of the lens and also lying within said channel and relatively long and slender temple supports shaped to follow substantially the upper contour shape of the lenses attached adjacent one end thereof to the bridge member and each having portions extending downwardly from said points of attachment and secured to the lens holding means for retaining it in the respective channel of the depending side portion of the bridge member.

5. A lense supporting structure for use with lenses comprising a bridge member having depending side portions formed with channels extending longitudinally thereof, lens holding means having portions shaped to overlie the edge of the lens lying within said channels and having a portion shaped to overlie at least one side surface of the lens and adapted to be secured to said lens, resilient means carried by said portion shaped to overlie the edge of the lens adapted to engage the adjacent edge of the lens and also lying within said channel and relatively long and slender temple supports shaped to follow substantially the upper contour shape of the lenses attached adjacent one end thereof to the bridge member and each having portions extending downwardly from said points of attachment and secured to the lens holding means for retaining it in the respective channel of the depending side portion of the bridge member and nose bearing pads carried by said depending side portions of the bridge member.

6. An ophthalmic mounting comprising a pair of lenses and a lens supporting structure for said lenses, said lens supporting structure comprising a bridge member having a central arch portion and integral depending side portions with longitudinal channels therein adapted to receive the adjacent contour edge of the lenses, lens holding means in the form of lens straps having portions shaped to overlie the opposed side surfaces of the lenses and to be secured to said lenses by connecting means extending through the lenses, said lens holding means having a portion shaped to overlie the edge of the lens and lying within the channel, relatively long and slender temple supports secured adjacent one end thereof to the lens holding means and secured adjacent said end to the bridge member with the end thereof attached to said lens holding means functioning to retain the lens holding means in desired position in said channel with the remainder of said long and slender temple supports shaped to follow the upper contour shape of the lenses when the supporting structure is in connected relation with said lenses.

7. An ophthalmic mounting comprising a pair of lenses and a lens supporting structure for said lenses, said lens supporting structure comprising a bridge member having depending side portions formed with channels shaped to embrace the adjacent edges of the respective lenses, lens holding means having a portion shaped to overlie the edges of the lenses lying within said channel and having portions shaped to overlie at least one side surface of the lenses and secured thereto, relatively long and slender temple supports shaped to follow substantially the upper contour edges of the lenses when in assembled relation therewith attached to the bridge member and having portions extending downwardly from said points of attachment with said bridge member and secured to the portion of the lens holding means lying within said channels.

8. An ophthalmic mounting comprising a pair of lenses and a lens supporting structure for said lenses, said lenses supporting structure comprising a bridge member having depending side portions formed with channels shaped to embrace the adjacent edges of the respective lenses, lens holding means having a portion shaped to overlie the edges of the lenses lying within said channel and having portions shaped to overlie at least one side surface of the lenses and secured thereto, relatively long and slender temple supports shaped to follow substantially the upper contour edges of the lenses when in assembled relation therewith attached to the bridge member and having portions extending downwardly from said points of attachment with said bridge member and secured to the portion of the lens holding means lying within said channels and said depending portions of the bridge member having nose bearing portions carried thereby.

9. An ophthalmic mounting comprising a pair of lenses and a lens supporting structure for said lenses, said lens supporting structure comprising a bridge member having depending side portions formed with channels extending longitudinally thereof, lens holding means having portions shaped to overlie the edge of the lens lying within said channels and having a portion shaped to overlie at least one side surface of the lens and secured to said lens, resilient means carried by said portion shaped to overlie the edge of the lens adapted to engage the adjacent edge of the lens and also lying within said channel and relatively long and slender temple supports shaped to follow substantially the upper contour shape of the lenses attached adjacent one end thereof to the bridge member and each having portions extending downwardly from said points of attachment and secured to the lens holding means for retaining it in the respective channel of the depending side portion of the bridge member.

10. An ophthalmic mounting comprising a pair of lenses and a lens supporting structure for said lenses, said lens supporting structure comprising a bridge member having depending side portions formed with channels extending longitudinally thereof, lens holding means having portions shaped to overlie the edge of the lens lying within said channels and having a portion shaped to overlie at least one side surface of the lens and secured to said lens, resilient means carried by said portion shaped to overlie the edge of the lens adapted to engage the adjacent edge of the lens and also lying within said channel and relatively long and slender temple supports shaped to follow substantially the upper contour shape of the lenses attached adjacent one end thereof to the bridge member and each having portions extending downwardly from said points of attachment and secured to the lens holding means for retaining it in the respective channel of the depending side portion of the bridge member and nose bearing pads carried by said depending side portions of the bridge member.

EDWARD M. SPLAINE.